(12) United States Patent
Moshammer (10) Patent No.: US 12,066,053 B2
(45) Date of Patent: Aug. 20, 2024

(54) TELESCOPIC SYSTEM

(71) Applicant: IGUS GMBH, Cologne (DE)

(72) Inventor: Horst Moshammer, Linz am Rhein (DE)

(73) Assignee: IGUS GMBH, Cologne (DE)

( * ) Notice: Subject to any disclaimer, the term of this patent is extended or adjusted under 35 U.S.C. 154(b) by 840 days.

(21) Appl. No.: 17/250,537

(22) PCT Filed: Aug. 1, 2019

(86) PCT No.: PCT/EP2019/070800
§ 371 (c)(1),
(2) Date: Aug. 3, 2021

(87) PCT Pub. No.: WO2020/025759
PCT Pub. Date: Feb. 6, 2020

(65) Prior Publication Data
US 2023/0160410 A1    May 25, 2023

(30) Foreign Application Priority Data
Aug. 2, 2018 (DE) ..................... 20 2018 104 466.4

(51) Int. Cl.
F16B 7/04 (2006.01)
F16B 7/10 (2006.01)
F16C 29/02 (2006.01)

(52) U.S. Cl.
CPC ............... *F16B 7/105* (2013.01); *F16B 7/04* (2013.01); *F16C 29/02* (2013.01)

(58) Field of Classification Search
CPC ... A47B 1/10; A47B 88/49; F16B 7/04; F16B 7/105; F16C 29/02; F16C 29/12
See application file for complete search history.

(56) References Cited

U.S. PATENT DOCUMENTS 2,822,232 A * 2/1958 Lhota ................... A47B 88/483
                                                          312/334.16
3,649,090 A * 3/1972 Dutot ................... A47B 88/497
                                                          384/23

(Continued)

FOREIGN PATENT DOCUMENTS

CN    101191517    6/2008
CN    202132386    2/2012

(Continued)

OTHER PUBLICATIONS

International Preliminary Report on Patentability of International Application No. PCT/EP2019/070800, dated Feb. 2, 2021.

(Continued)

*Primary Examiner* — Daniel J Wiley
(74) *Attorney, Agent, or Firm* — Grossman, Tucker, Perreault & Pfelger, PLLC (57) ABSTRACT

A telescopic system comprising at least two profiled rails which are guided linearly on one another in the longitudinal direction, are movable relative to one another over a distance and each have a longitudinal profile with longitudinal grooves and/or longitudinal ribs wherein at least one sliding element is provided on each profiled rail, via which sliding element the at least two profiled rails bear against one another in a slidable manner, and which sliding element is arranged so as to be fastened in an axially non-displaceable manner, at least with respect to the longitudinal direction, on the longitudinal profile of the associated profiled rail. Such a telescopic system is intended to be simpler in design and able to be mounted more easily. This is achieved in that the sliding element, at least with respect to a sliding plane defined by the longitudinal direction and a first transverse direction perpendicular to the longitudinal direction, is then connected to a clamping element so as to be fixed against displacement on the profiled rail, wherein the clamping (Continued)

element is arranged with a clamping fit on the longitudinal profile of the profiled rail, to be precise in or on a longitudinal groove and/or on a longitudinal rib.

28 Claims, 3 Drawing Sheets

(56) References Cited

U.S. PATENT DOCUMENTS

| | | | | |
|---|---|---|---|---|
| 4,440,461 | A * | 4/1984 | Powell | A47B 88/423 384/23 |
| 5,460,574 | A | 10/1995 | Hobaugh | |
| 5,938,340 | A * | 8/1999 | Brodersen | F16C 29/02 384/42 |
| 6,076,908 | A * | 6/2000 | Maffeo | A47B 88/427 248/222.51 |
| 7,347,516 | B2 * | 3/2008 | Hay | A47B 88/477 312/334.46 |
| 7,370,920 | B2 * | 5/2008 | Wang | A47B 88/40 312/334.17 |
| 9,107,500 | B2 | 8/2015 | Zimmermann | |
| 9,790,989 | B2 | 10/2017 | Breitfuss et al. | |
| 10,094,421 | B2 * | 10/2018 | Yen | F16C 29/02 |
| 10,869,548 | B2 | 12/2020 | Spreen | |
| 2004/0096129 | A1 * | 5/2004 | Schmalzhofer | B23Q 1/58 384/42 |
| 2005/0074190 | A1 | 4/2005 | Traiser et al. | |
| 2006/0083447 | A1 * | 4/2006 | Moshammer | F16C 29/02 384/26 |
| 2008/0157607 | A1 | 7/2008 | Scheich et al. | |
| 2008/0193062 | A1 * | 8/2008 | Ropp | B60N 2/075 384/34 |
| 2008/0226208 | A1 * | 9/2008 | Duan | F16C 29/02 384/35 |
| 2008/0226280 | A1 | 9/2008 | Zhi-Ming et al. | |
| 2008/0279490 | A1 * | 11/2008 | Holcomb | E05B 65/462 384/42 |
| 2010/0104225 | A1 | 4/2010 | Watson | |
| 2011/0234071 | A1 * | 9/2011 | Yu | A47B 88/49 312/334.1 |
| 2012/0213457 | A1 * | 8/2012 | Schroeder | F16C 29/001 384/41 |
| 2014/0321778 | A1 * | 10/2014 | Buchmann | F16C 29/10 384/26 |
| 2018/0066706 | A1 * | 3/2018 | Yen | F16C 33/205 |
| 2018/0216663 | A1 * | 8/2018 | Korn | F16C 29/02 |

FOREIGN PATENT DOCUMENTS

| | | |
|---|---|---|
| CN | 103453015 | 12/2013 |
| CN | 103763988 | 4/2014 |
| CN | 104471261 | 3/2015 |
| CN | 105452688 | 3/2016 |
| CN | 107725590 | 2/2018 |
| DE | 20203069 | 7/2002 |
| DE | 102004010503 | 9/2005 |
| DE | 202013104485 | 10/2013 |
| DE | 102016103527 | 6/2016 |
| DE | 102016103566 | 8/2017 |
| EP | 0790420 | 8/1997 |
| EP | 0822342 | 2/1998 |
| EP | 1249189 | 10/2020 |
| IT | MI20110601 | 10/2012 |
| JP | H09291937 | 11/1997 |
| JP | 2007000253 | 1/2007 |
| KR | 10-2011-0091724 | 8/2011 |
| WO | 2010067437 | 6/2010 |

OTHER PUBLICATIONS

International Search Report of International Application No. PCT/EP2019/070800, dated Sep. 18, 2019.
Search Report from related Chinese Appln. No. 201980063395.0, dated Jun. 24, 2022. 4 pages.
Office Action from related Japanese Appln. No. 2021-505890, dated Jun. 7, 2022. English translation attached. 11 pages.
Office Action from related Korean Appln. No. 10-2021-7006291, dated Mar. 22, 2023. English translation attached.

* cited by examiner

TELESCOPIC SYSTEM

FIELD

The invention concerns a telescopic system having at least two profile rails which are linearly guided against each other in the longitudinal direction and which are moveable relative to each other over a distance and which each have a longitudinal profile having longitudinal grooves and/or longitudinal ribs, wherein provided at each profile rail is at least one sliding element, by way of which the at least two profile rails bear slidingly displaceable against each other and which is arranged axially fixedly at least with respect to the longitudinal direction on the longitudinal profile of the profile rails associated therewith.

BACKGROUND

A telescopic system of the general kind set forth is disclosed in DE 10 2016 103 566 A1. The telescopic system has two hollow profiles which are guided one within the other and between which a respective sliding element is injected directly into an intermediate space between the hollow profiles by means of an injection molding lance in situ at certain locations, wherein the sliding element for a better holding action engages with a base into an internal groove in the radially outer hollow profile or an outer groove in the radially inner hollow profile. That is elaborate in terms process technology and complicated in respect of assembly. In addition the sliding element can become loose in use, can be displaced longitudinally in the groove or can even become detached therefrom.

A further telescopic system having two hollow profiles which are guided within each other and which are supported against each other by way of hollow-cylindrical sliding elements is known from DE 10 2004 010 503 A1. The sliding elements are respectively secured against axial displacement by transverse bolts engaging into transverse bores. Accordingly structural modifications in the profile rails are required with the transverse bores for fixing the sliding element.

The catalog "dry-tech Lagertechnik" from the applicant, dating from 2015, page 840, presents a telescopic system in which the sliding element is of a rail-like configuration and is slidingly displaceably mounted between the two and at the two profile rails. As the sliding element is telescopic it is correspondingly heavily flexurally loaded when fully extended. Such a telescopic system is therefore not suitable for heavier loads to be carried.

SUMMARY

An object of the present invention is to provide a telescopic system of the general kind set forth, which is of a simple structure and easier to assemble. In addition the invention seeks to provide that the sliding element is non-displaceably held to the respectively associated profile rail. Furthermore the invention seeks to provide that no structural modification to the profile rails is required for fixing the sliding element. In addition the aim of the invention is to provide that the telescopic system is suitable for carrying greater load moments.

The object of the invention is already attained in that the sliding elements is connected to a clamping element in displaceably fixed relationship on the profile rail at least with respect to a sliding plane defined by the longitudinal direction and a first transverse direction perpendicularly to the longitudinal direction, wherein the clamping element is arranged with a clamping fit on the longitudinal profile of the profile rail, more specifically in or at a longitudinal groove and/or on a longitudinal rib.

The clamping fit of the clamping element on the longitudinal profile does not require any further precautions or structural modifications to the profile rails. That simplifies construction and assembly of the telescopic system. By virtue of the clamping fit by way of a clamping element on the longitudinal profile the sliding element can be held non-displaceably to the respectively associated profile rail. As at least one clamping element is associated with each profile rail the at least two profile rails in the installed position are arranged guided slidably on each other at the at least two sliding elements.

In the present invention the profile rails alone form the telescopic members. A change in length achieved by the telescopic system is effected solely by way of the profile rails. Therefore the telescopic system can also be designed for greater load moments. No further processing of the respective profile rail is necessary for inserting the sliding elements into or fixing them in the telescopic system and/or for axially non-displaceably fixing the sliding element to the respective profile rail. For example no bores have to be provided for receiving the sliding element, into which or to which the sliding elements are fitted or screwed. Therefore the profile rail can be cut to a given length from a profile section and installed in the telescopic system without further precautionary measures.

In the installed position the profile rails can be arranged to bear slidingly displaceably against each other solely by way of the at least two sliding elements. In particular one of the at least two sliding elements can be axially non-displaceably fixed to the one of the at least two profile rails and the other of the at least two sliding elements can be axially non-displaceably connected to the other of the at least two profile rails. The two profile rails can be arranged to engage into each other by way of a groove-and-tongue connection. In the tongue-and-groove connection the longitudinal grooves can form the groove and the longitudinal projections can form the tongue. Likewise the profile rails can be arranged to engage into each other by way of the associated sliding elements in the form of the tongue-and-groove connection. The longitudinal grooves of the longitudinal profile can form the groove and the longitudinal ribs of the longitudinal profile can form the tongue. That association of longitudinal grooves and longitudinal ribs in the tongue-and-groove connection implies that the two profile rails can have longitudinal profiles which are admittedly different but adapted to each other.

Preferably the profile rails are made from metal, in particular an aluminum alloy, in particular a high-strength aluminum alloy. That choice of material makes it possible to carry and transmit relatively large loads. The profile member is preferably extruded but can also be injection molded. In that case the profile member can have the complete longitudinal profile which is intended for forming the telescopic system with at least two profile rails respectively cut to length on a profile member.

Desirably in terms of force mechanics the sliding element arranged non-displaceably on the profile rail can be arranged to be supported with respect to the longitudinal direction over its entire axial length on that profile rail. The sliding element can be arranged to be held fixedly in the telescopic system in the installed position with respect to that profile rail without any degree of freedom. The clamping fit permits a play-free arrangement of the sliding element on the profile rail.

In the installed position the longitudinal groove and/or longitudinal rib can be designed to be open laterally towards the respective sliding connection partner or can be arranged to extend thereto. The longitudinal groove can be opened laterally perpendicularly or approximately perpendicularly to the sliding plane. In a corresponding fashion the longitudinal rib can extend with its free end region perpendicularly or approximately perpendicularly to the sliding plane. The direction perpendicular or approximately perpendicular to the sliding plane defines a second transverse direction. That can be perpendicular or approximately perpendicular to the first transverse direction and to the longitudinal direction. The longitudinal groove can be laterally delimited by two longitudinal ribs or by a longitudinal rib and an inside wall. The longitudinal rib can also be referred to as a longitudinal projection of the longitudinal profile. To save weight the longitudinal rib can be in the form of a hollow rib.

The clamping element can engage into or on the longitudinal groove perpendicularly to the sliding plane laterally or axially with respect to the longitudinal direction into the longitudinal groove. The clamping element can be introduced into the longitudinal groove in the longitudinal direction or perpendicularly thereto in lateral relationship. Similarly the clamping element can be fitted over the longitudinal projection perpendicularly to the sliding plane or can be axially pushed into place thereon with respect to the longitudinal direction.

As usual the profile rails which are mounted slidingly displaceably against each other can be arranged in the telescopic system in spaced relationship by way of the sliding element, thereby forming a sliding gap. Because of advantageously smaller structural heights the sliding gap can be equal or approximately equal to an average wall thickness of the sliding element. The magnitude of the spacing can be defined by the geometry, in particular by the wall thickness, of the sliding element.

In a development of the telescopic system the sliding element and the clamping element can be arranged fixed to each other in positively locking relationship and/or force-locking relationship at least with respect to the longitudinal direction or the sliding plane. The sliding element and the clamping element can bear against each other remaining loose in positively locking relationship. The sliding element can be arranged to be clamped between two clamping elements, thereby providing a force-locking relationship, wherein the two clamping elements are each arranged in the clamping fit on the longitudinal profile. Advantageously by virtue of a firmer connection it can be provided that the sliding element and the clamping element latch to each other, preferably with the formation of a spring force. For latching purposes it is possible to provide on the sliding element and the clamping elements mutually adapted usual latching means like a dome-like raised portion which engages into a correspondingly trough-like recess, or also an undercut configuration into which a suitably matched projection engages. In particular the sliding element and the clamping element can be connected together by way of a positively locking connection. Desirably in terms of construction and assembly the sliding element can be arranged to engage axially over the clamping element with respect to the longitudinal direction and can be arranged to bear against the clamping element axially at both ends of the clamping element. The sliding element can be arranged to be non-displaceable and non-rotatable perpendicularly to the first transverse direction or perpendicularly to a second transverse direction perpendicular to the first transverse direction, and can be held non-rotatable with respect to the longitudinal direction. Both transverse directions can be oriented perpendicularly or at least approximately perpendicularly to the longitudinal direction. In the installed position in the telescopic system forces and force moments in or in relation to all directions can be carried by the sliding element.

The clamping element can be of an elongate shape. It can be of a cylindrical, part-cylindrical, semi-cylindrical, prismatic, ellipsoidal, lens-like or ball-like shape. The clamping element can also be in the form of a bolt, pin or ball. The clamping element may have a surface structure like increased roughness or peripheral ribs to increase friction. The clamping element can have radially outwardly peripheral surface structures similar to those of a grooved, screw or notched nail. In particular bolts or pins can have a male thread which preferably extends over the entire axial length of the bolt or pin. The bolt or pin can be of a conically tapering configuration at least at one of its two end regions for easier introduction into and clamping fast in the longitudinal groove. Similarly the ball in the installed position can taper in the longitudinal direction by for example being of an ellipsoidal configuration.

The sliding element can advantageously be simply coupled, in particular connected, by way of a push-in connection or a plurality thereof, in particular on the basis of the tongue-and-groove principle, to the longitudinal profile of the respectively associated profile rail. In a development of the telescopic system the sliding element can be in the form of a profile part with a longitudinal profile extending in the longitudinal direction in the installed position. Similarly to the profile rails the longitudinal profile can have longitudinal grooves and/or in particular rib-like longitudinal projections for engagement into an associated longitudinal groove of an associated profile rail.

For clamping the sliding element to an associated profile rail the clamping element can be arranged in the associated longitudinal groove with a clamping fit therein. For its axially non-displaceable connection at least in respect of the longitudinal direction to the one profile rail associated therewith, the sliding element can engage into the longitudinal groove of said one profile rail, that has the clamping element, and/or into the longitudinal groove of the other profile rail, that has the clamping element. The sliding element can have at least one rib-like longitudinal projection having a receiving recess. In the installed position the rib-like longitudinal projection can engage into the longitudinal groove associated therewith with the clamping element with the clamping element being received in the receiving recess. Conversely the profile rail can also have a longitudinal rib which engages into a longitudinal groove on the sliding element, wherein the clamping element is arranged at the longitudinal rib, for example with lateral clamping embracing thereof. The clamping element can be received in the receiving groove with resilient expansion thereof. The sliding element can thus be held to the clamping element in force-locking relationship in addition to the positively locking relationship.

The engagement of the clamping element into the receiving recess can be effected in positively locking relationship at least with respect to the longitudinal direction. The receiving recess can be in the form of an interruption, gap or incision in the rib-like longitudinal projection. The receiving recess can be adapted in respect of the longitudinal direction to the axial length of the clamping element. In the installed position the rib-like longitudinal projection of the sliding element can extend with its free end region in the second transverse direction. In the installed position the longitudinal directions of the profile rail, the sliding element and the clamping element can be the same.

The sliding element can be of a flat basic shape with a base parallel to the sliding plane, wherein at least the one rib-like longitudinal projection and/or a rib-like further projection can extend as a prolongation of the base in the first transverse direction from one side of the base perpendicularly to the sliding plane. In the installed position the base can be arranged to extend parallel to the sliding plane. In the flat basic shape the height of the sliding element, that extends in the second transverse direction in the installed position, can be substantially less, for example three to ten times less, than the extent of the sliding element in the first transverse direction. The sliding element can be arranged in positively locking relationship in an additional longitudinal groove in the one profile rail, which groove is open laterally in the second transverse direction. The sliding element can lie with its base in flat surface relationship on the bottom of the additional longitudinal groove. In addition it can be supported in the additional longitudinal groove at both sides with respect to the first transverse direction. The two longitudinal projections can extend away from the groove bottom in the direction of the lateral opening of the additional longitudinal groove.

The wall thickness of the sliding element can be the same or at least approximately the same in all of its regions. Amongst other things a gap dimension of a gap can be set by way of the wall thickness of the base, by way of which gap the profile rails are held spaced from each other perpendicularly to the sliding plane. The at least one rib-like longitudinal projection and the rib-like further projection of the sliding element can be arranged spaced from each other with respect to the first transverse direction.

In a further embodiment of the telescopic system the sliding element can have two rib-like longitudinal projections. One of the two longitudinal projections can be coupled to the longitudinal profile of the profile rail, to which the sliding element is fixed in the installed position. The other of the two longitudinal projections can be coupled to the longitudinal profile of the profile rail which bears slidably against the sliding element in the installed position.

The two longitudinal projections can be arranged to extend away from the same side of the base in a common direction perpendicularly or approximately perpendicularly to the sliding plane. The two longitudinal projections can be arranged completely at that side. One of the two longitudinal projections can extend in that common direction. That longitudinal projection which is referred to as the first longitudinal projection can extend with its free end region in that common direction. In addition a longitudinal projection referred to as the second longitudinal projection can be of a hook-like curved configuration. In particular the second longitudinal projection can be bent over in a hook-shaped configuration about an axis of curvature parallel to the longitudinal direction at its free end region, thereby forming a receiving groove for a longitudinal rib of an associated profile rail. The receiving groove can be laterally open in the opposite direction to the common direction. The second longitudinal projection can extend with the free end region of the hook-like shape in the opposite direction to that common direction towards the side. Preferably the free end of the hook-like shape remains spaced in relation to the side of the base, from which the second longitudinal projection extends. The second longitudinal projection can be curved in a hook-shaped configuration about an axis of curvature parallel to the longitudinal direction to less than 90%, preferably less than or equal to 60% of its extent in the longitudinal direction. The two longitudinal projections can each have a receiving means for the clamping element, which is desirable in regard to universal positioning of the sliding element in the telescopic system. Preferably associated with each longitudinal projection of the sliding element is a longitudinal groove in the longitudinal profile of the associated profile rail.

All sliding elements used in the telescopic system can be of the same structure. In addition they can be in one piece. The axial extent of the sliding element, with respect to the longitudinal axis, can be less than or equal to 40%, less than or equal to 20% or less than or equal to 5% of the corresponding axial length of the associated profile rail.

The rib-like further projection of the sliding element can have a free end region which defines a further receiving groove which is open laterally in the first transverse direction for a receiving rib of an associated profile rail. The receiving groove can be defined by the hook-like curvature of the free end region. The free end region of the rib-like further projection of the sliding element can be bent over hook-like parallel to the longitudinal direction. The rib-like further longitudinal projection can be curved in a hook configuration over up to less than 90%, preferably less than 60% of its extent perpendicularly to the longitudinal direction. A corresponding axis of curvature can be oriented parallel to the longitudinal direction. The rib may also be a longitudinal rib defining a longitudinal groove.

The rib-like further projection can engage into a further longitudinal groove in an associated profile rail in the first or approximately in the first transverse direction. The further longitudinal groove can advantageously be arranged outwardly with respect to the first transverse direction. The further longitudinal groove can be laterally open towards the center with respect to the first transverse direction. Advantageously, the profiles of the further longitudinal groove and the further longitudinal projection can be of a mutually matching configuration.

The further rib-like longitudinal projection can be designed to be resilient, primarily perpendicularly to the sliding plane. In particular the rib-like further longitudinal projection can be of a leaf spring-like configuration. To be able to move the sliding element with its receiving means relative to the sliding plane over the clamping element associated therewith the sliding element, in a first step, can be introduced with its resilient further longitudinal projection into the further longitudinal groove of the associated profile rail, with angular positioning relative to the sliding plane at the end thereof. The sliding element can then be displaced axially in the further longitudinal groove until the receiving means is arranged aligned with the clamping element with respect to the second transverse direction. In a further step the sliding element can be pivoted over its further longitudinal projection that projects into the further longitudinal groove, with the clamping element being simultaneously received in its receiving means, towards the sliding plane. In that situation latching of the sliding element to the clamping element can additionally be effected.

To secure the profile rails to prevent relative movement perpendicularly to the sliding plane it can be provided that the other profile rail as a sliding partner in relation to the one profile rail engages with a receiving projection into the receiving groove thereof. The receiving groove of the one profile rail, the receiving projection of the other profile rail and the further projection of the sliding element can be dimensioned in mutually matching relationship such that in particular they bear against each other over sliding guide surfaces facing in the second transverse direction, preferably without play or approximately without play. By virtue of the engagement of the receiving projection of the other profile rail by way of the longitudinal groove in the sliding element into the receiving groove of the one profile rail the longitudinal groove can be urged with at least parts of its wall at the inside against the wall of the receiving groove. The two profile rails can bear against each other slidingly displaceably, in particular without play or almost without play, by way of the sliding elements in sliding guide surfaces described in greater detail hereinafter. The components profile rail and sliding element can slide against each other at the sliding guide surfaces, with simultaneous guidance thereof. Associated with each sliding guide surface of the sliding element there can be a corresponding sliding guide surface of one of the at least two profile rails.

In addition the receiving groove can have an undercut configuration which is operative preferably in the first transverse direction and in particular radially inwardly with respect to the longitudinal direction. The further projection which is adapted to the receiving groove can be arranged to be held against a possible relative movement in the first transverse direction in positively locking relationship at the undercut configuration in the receiving groove. By virtue of those measures the two sliding partners and the sliding element which embraces the receiving projection can be at least stabilized in position in relation to a relative movement in the first transverse direction. In particular they can bear against each other without play or almost without play with respect to the first transverse direction.

The at least one rib-like longitudinal projection or the two rib-like longitudinal projections can be arranged spaced from the rib-like further projection of the sliding element with respect to the first transverse direction. The sliding element can thus have two axially separate regions in relation to the first transverse direction and/or the longitudinal direction. The one longitudinal projection or the two longitudinal projections can be arranged in an axially inward region. They can have first sliding guide surfaces perpendicular to the first transverse direction. Arranged axially at the edge in the other of the two axial regions the further longitudinal projection can have the above-mentioned second sliding guide surfaces which are parallel to the sliding plane. Amongst other things those structural measures mean that all sliding elements can be of the same structural configuration.

The sliding element can be made from plastic, in particular friction-reducing, also wear-resistant plastic. In particular it is possible to use a tribopolymer as the material for the sliding element. By virtue of solid lubricants which are incorporated into the compound it is possible to provide for lubricant-free dry running which is also suitable for use for example in foodstuff sectors. In addition it is possible to achieve a relative movement of the profile rails, involving a low noise level. The sliding element can be produced by injection molding. It can also be inexpensively cut to length from a profile member which is prefabricated for example by extrusion or injection molding. The sliding element thus permits a sliding bearing configuration for the two profile rails which are displaceable relative to each other. The sliding bearing configuration is corrosion-resistant as well as maintenance-free and lubricant-free by virtue of the material pairing.

In particular at least some of the sliding guide surfaces can be cooperating at least in pair-wise relationship or at least in threes. The sliding guide surfaces of each sliding guide surface pair or triple can be arranged parallel to each other and facing towards or away from each other. In particular some sliding guide surfaces which are in the form of first sliding guide surfaces can be provided perpendicularly to the first transverse direction or some sliding guide surfaces in the form of second sliding guide surfaces can be perpendicular to the second transverse direction. At least one longitudinal projection of the sliding element can have first sliding guide surfaces, in particular all first sliding guide surfaces provided on the sliding element, which is simple in terms of construction and assembly. In addition the further longitudinal projection and the base of the sliding element can have second sliding guide surfaces, in particular all second sliding guide surfaces provided on the sliding element. The first sliding guide surfaces can be arranged spaced relative to the second sliding guide surfaces, with respect to the first transverse direction.

For assembly it is proposed that the profile rails be pushed into each other at the ends in the longitudinal direction. Because of the sliding element which is already pre-fitted and the advantageously tighter guidance of the profile rails in each other, which is play-free or almost play-free, the profile rails in practice have to be "threaded" into each other.

An insertion aid can be provided for the assembly of two profile rails which are each provided with the desired number of sliding elements, to form a play-free or almost play-free assembly of the profile rails. The insertion aid can include one or more measures to facilitate the respective phase of assembly in which the profile rails are pushed into each other in the longitudinal direction at the ends, provided with the sliding elements. A measure which has already been described hereinbefore for that purpose can be that the first sliding guide surfaces are arranged spaced relative to the second sliding guide surfaces, with respect to the first transverse direction. A further measure can provide that the narrow end of the wall with the sliding guide surfaces is arranged spaced perpendicularly to the first transverse direction with respect to the longitudinal direction or displaced relative to the narrow end of the wall with the sliding guide surfaces perpendicularly to the second transverse direction. That displacement can be provided in and/or in opposite relationship to the longitudinal direction. The narrow ends of the sliding guide surfaces, that face in the longitudinal direction, can reach the end of the profile rail which is to be displaced over the sliding element, in displaced relationship corresponding to the axial displacement of the ends thereof. Interengagement of two profile rails as sliding partners can be effected with successive orientation at the various sliding guide surfaces like for example the sliding guide surfaces perpendicularly to the second transverse direction and then the sliding guide surfaces perpendicularly to the first transverse direction. As a further measure it can be provided that the ends of the sliding guide surfaces, that face in the longitudinal direction, are each preferably beveled at both sides. They can have inclined insertion surfaces which respectively act as an inclined plane. That beveling can be provided on both ends of the sliding elements, that face in the longitudinal direction. The above-described measures permit universal use of the sliding elements in the telescopic system. As a result the sliding elements of the telescopic system can also be of an identical structure.

The at least two sliding elements arranged between the at least two profile rails can be arranged in collinear and axially mutually spaced relationship with respect to the longitudinal direction. The two sliding elements can be positioned on a central axis extending in the longitudinal direction. The two sliding elements can be arranged centrally in the telescopic system with respect to the first transverse direction.

There can also be three sliding elements between the two profile rails. Advantageously in terms of force mechanics, they can be arranged at the corner points of an isosceles triangle with respect to the sliding plane. In an advantageous development of the telescopic system there can be four sliding elements, by way of which the two profile rails bear slidingly displaceably against each other. The sliding elements can be arranged and/or oriented in mirror-image symmetrical relationship with each other with respect to a central first plane of mirror-image symmetry perpendicularly to the first transverse direction. Correspondingly at least the parts of the longitudinal profiles of both profile rails, with which the sliding elements are coupled, can be of a mirror-image symmetrical configuration with respect to that first plane of mirror-image symmetry. The sliding elements can be combined together to form two sliding element pairs each having two sliding elements. The two sliding element pairs can be arranged spaced from each other with respect to the longitudinal direction. In particular the sliding elements of preferably each sliding element pair can be arranged at the same level with respect to the longitudinal direction. Desirably the one sliding element pair of the at least two sliding element pairs can be axially non-displaceably connected to the one of the at least two profile rails and the other sliding element pair of the at least two pairs can be axially non-displaceably connected to the other of the at least two profile rails. Particularly when greater widths in the first transverse direction of the profile rail are involved sliding element triples can be provided for improved support thereof at the sliding elements.

The longitudinal grooves for receiving the clamping element of the one profile rail can be arranged axially spaced with respect to the first transverse direction in relation to the longitudinal grooves for receiving the clamping element of the other profile rail. In the installed position the longitudinal grooves of the one profile rail can be arranged axially inwardly with respect to the first transverse direction, in relation to the longitudinal grooves of the other profile rail.

In particular the sliding elements can be respectively arranged in an end region of the respectively associated profile rail in relation to the longitudinal direction. They can also terminate flush at their ends with the respectively associated end of the profile rail. The bases of the sliding elements disposed between the two profile rails can be arranged in a common plane parallel to the sliding plane.

The telescopic system according to the invention can thus be produced and assembled very easily. To produce a telescopic system with for example two profile rails they can be provided by each being cut to length from a profile member. In that case, as described above, the longitudinal profiles of the two profile members are so adapted to each other that in the installed position they engage into each other in a tongue-and-groove connection. Furthermore it is possible to provide at least two sliding elements which can be cut to length from a single profile member. The at least two sliding elements can thus be of the same structure and in one piece. Furthermore at least one clamping element can be provided per sliding element. The clamping elements can be cut to length from an elongate portion. The clamping elements can be of the same structure and in one piece.

In a first assembly step one of the two sliding elements can be fixed to a profile rail and the other sliding element can be fixed to the other profile rail each at least axially non-displaceably with respect to the longitudinal direction. For that purpose in a first sub-step one of the clamping elements can be introduced into the longitudinal groove associated therewith in one of the two profile rails and the other clamping element can be introduced into the longitudinal groove associated therewith in the other of the two profile rails, in each case in a clamping fit. In a further sub-step the two sliding elements can be moved over the respective clamping element associated therewith. For that purpose, they can each be pushed into the further longitudinal groove with their further longitudinal projection pivotably about a pivot axis parallel to the longitudinal direction until they are each moved axially with their receiving means over the associated clamping element, with respect to the longitudinal direction. The sliding element can then be lowered over the clamping element with a pivotal movement and in that case receive the clamping element in the receiving opening. The sliding element can thus be arranged slidingly displaceably for assembly thereof with its further longitudinal projection in the longitudinal direction and pivotably about a pivot axis parallel to the longitudinal direction in the further longitudinal groove.

In a further assembly step the two profile rails respectively provided with at least one sliding element can be pushed into each other at the ends so that they bear against each other by way of the at least two sliding elements.

In a development of the telescopic system an abutment device can be provided to limit the linear travel. That can have at least two end abutments. The end abutments can form the above-described sliding elements. Additional end abutments are viewed as being mechanically more stable. They can be arranged in a further longitudinal groove of the respective profile rail. In addition there can be a abutment element cooperating with the end abutments. The abutment element can be arranged slidingly displaceably or fixed in position in the further longitudinal groove of the other profile rail. The abutment element can be held axially non-slidably in the further groove associated therewith by means of a clamping element. In both cases the clamping element can be held in a clamping fit in the associated further longitudinal groove. In addition the travel can be set by way of the longitudinal extent of the abutment element. Advantageously in terms of construction and assembly the clamping element can be exactly identical to the clamping element described hereinbefore and hereinafter, which is used for non-displaceable mounting of the sliding element. That means that the end abutments can be heavily loaded.

The abutment groove can have at least one buffer element arranged between the abutment element and one of the two end abutments and at least one buffer element arranged between the abutment element and the other end abutment. The buffer elements can be guided freely displaceably in the abutment groove and/or can be fixed at the ends to the abutment element. The provision of the buffer elements can increase the service life of the end abutments and/or the abutment element. The abutment element can engage latchingly into the further abutment groove. It can have at least one guide groove which extends in the longitudinal direction and into which the abutment element engages with a longitudinal projection adapted to the guide groove.

For final assembly in a first sub-step firstly only one end abutment can preferably be positioned at the desired location and the for example two profile rails, as described above, can be pushed at the ends into an assembly device. In a further sub-step the second end abutment can also be moved in the assembly direction in a clamping fit into the further longitudinal groove. A single abutment device can be provided for each two profile rails which are mounted slidingly displaceably against each other. It can be arranged at the edge on the profile rails in relation to the longitudinal direction.

Usually the profile member for producing a profile rail can be provided at the factory with openings equally spaced in the longitudinal direction for fixing the profile rails which have been cut to length from the profile member to components or the like. In that case the spacings and number of the openings can be so selected that each profile rail cut to length from the profile member has at least two openings.

A further embodiment of the telescopic system can have three profile rails which are mounted to each other linearly displaceably relative to each other, two outer profile rails and a central profile rail mounted relatively displaceably between the two outer profile rails. They can be arranged slidably against each other in the longitudinal direction relative to each other in the longitudinal direction and parallel to the sliding plane. The central profile rail can thus be connected towards both sides to a respective one of the outer profile rails slidably displaceably in the longitudinal direction. For that purpose the central profile rail can have a longitudinal profile, by way of which it can be mechanically coupled towards both outer profile rails with the respective outer profile rail.

By virtue of the tongue-and-groove connection provided between the profile rails their longitudinal profiles differ from each other. To provide the sliding displaceable connection two respective longitudinal profiles of differing configuration can be connected together. In that case the two outer profile rails each have an identical longitudinal profile while the central profile rail has a longitudinal profile which is adapted at both sides in relation to the second transverse direction to that of the outer profile rails and in particular of the same structure. The two outer profile rails can be of the same structural configuration.

The central profile rail may have an identical profile at each of its sides towards the two outer profile rails. The central profile rail can be of a mirror-image symmetrical structure with respect to the central first plane of mirror-image symmetry perpendicularly to the first transverse direction and with respect to a central second plane of mirror-image symmetry perpendicularly to the second transverse direction. It can have a transverse bar arranged parallel to the sliding plane, with guide grooves at both ends with respect to the transverse direction. The arrangement and configuration of the guide grooves can be the same at both ends of the transverse bar.

As a continuation in the possible options for enlargement of the telescopic system it can have for example six profile rails of which the two outer profile rails can also be of the same profile which extends from one side substantially in the second transverse direction. The remaining four profile rails between the two outer ones can each be of the same longitudinal profile at both sides. Profile rails which in the installed position are adjacent to each other with respect to the second transverse direction can each involve different longitudinal profiles.

BRIEF DESCRIPTION OF THE DRAWINGS

In advantageous embodiments the telescopic system has one or more of the above-indicated features, more specifically in any combination. Further details and advantages of the invention will be apparent hereinafter, without restriction on the scope of protection, from the description of preferred embodiments with reference to the accompanying drawings. All terminology for describing location like up, down, front, back, right and left are intended as they are shown in the respective Figure itself, unless it is specifically defined otherwise. In the drawings:

FIGS. 1A-1D each show a view of an embodiment of a telescopic system with three profile rails as telescopic members, more specifically in an extended position, FIGS. 2A-2D each show a view of the embodiment of the telescopic system of FIGS. 1A-1D but in a retracted position.

DETAILED DESCRIPTION

Figure 7:
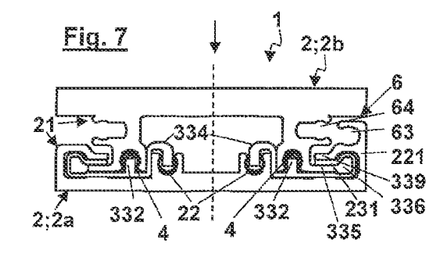
FIG. 7 shows a side view of a further embodiment of the telescopic system with two telescopic rails.
Figure 8:
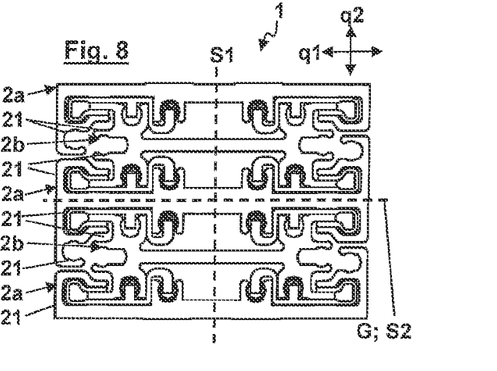
FIG. 8 shows a side view of a further embodiment of the telescopic system with five telescopic rails, FIGS. 9A-9C each show a view of the embodiment of the telescopic system of FIGS. 1A-1D in the extended position but with an abutment device, and FIGS. 10A-10C each show a view of the embodiment of the telescopic system of FIGS. 9A-9D but in the retracted position.
Figure 9A:
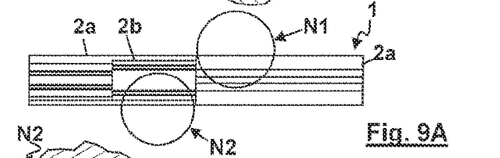
Figure 9B:
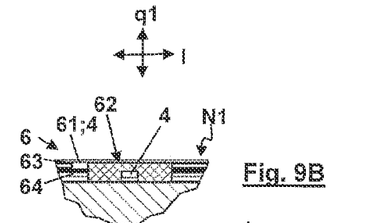
Figure 9C:
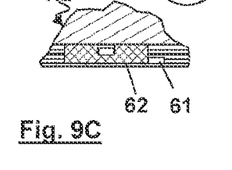
Figure 10A:
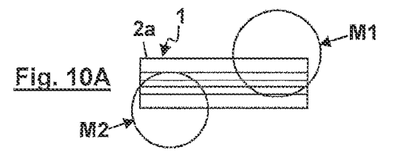
Figure 10B:
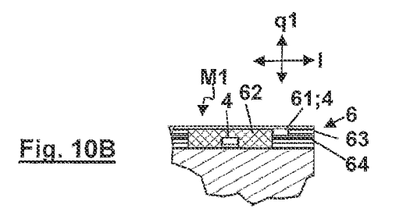
Figure 10C:
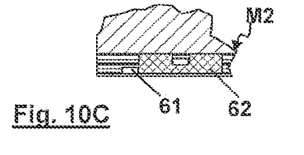

FIGS. 1 through 5 and 7 through 10 show various views and sectional views of different embodiments of a telescopic system 1. The telescopic system 1 has at least two profile rails 2 which are guided linearly against each other in a longitudinal direction 1 and which are moveable relative to each other over a travel distance w shown in FIG. 5A. The profile rails 2 are each provided with a longitudinal profile 21 having longitudinal grooves 22 and longitudinal ribs 23. As shown in FIGS. 7 and 8 the telescopic system 1 has two and five respectively relatively mutually moveable profile rails 2. In the other views showing the telescopic system 1 there are three profile rails 2, two outer first profile rails 2a, each here of a C-shaped profile, and a central second profile rail 2b arranged between the two outer first profile rails 2a.

Figure 6A:
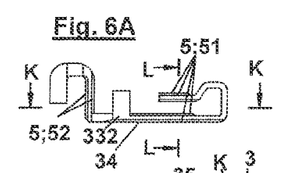
FIGS. 6A-6C show a side view and sectional views of the sliding element.
Figure 6B:
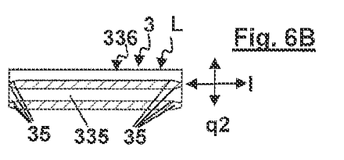
Figure 6C:
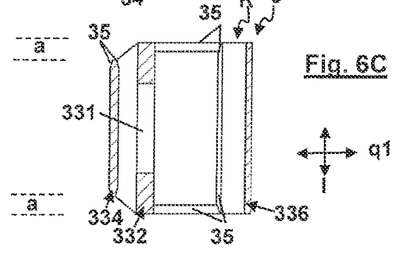

In this arrangement provided between each two profile rails 2 which are guided linearly against each other are four sliding elements 3, by way of which those two profile rails 2 bear against each other slidingly displaceably. FIGS. 6A-6C each show an individual view of a sliding element 3. The sliding element 3 is in the form of a profile portion with a longitudinal profile 32 extending in the longitudinal direction l in the installed position. The sliding elements 3 shown in the various embodiments of the telescopic system 1 are of the same construction and are in one piece. In addition they are cut to length from a plastic profile member (not shown) comprising a tribopolymer with solid lubricants incorporated in the compound, for lubricant-free dry running. The profile rails 2 are each cut to length from a profile member (not shown here) of an aluminum material. By virtue of the tongue-and-groove connection the profile rails 2 which are coupled as sliding partners are each of another longitudinal profile 21.

The sliding elements 3 are respectively connected non-displaceably to a clamping element 4 at the associated profile rail 2 with respect to a sliding plane G defined by the longitudinal direction 1 and a first transverse direction q1 perpendicular to the longitudinal direction l. The clamping element 4 is arranged in a clamping fit here in a longitudinal groove 22 in the longitudinal profile 21 of that profile rail 2. By virtue of the clamping fit of the clamping element 4 the sliding element 3 can be held non-displaceably to the respectively associated profile rail 2. All sliding elements 3 are respectively connected by way of a clamping element 4 to the respectively associated profile rail 2. By virtue of that measure the profile rails 2 remain unchanged in their configuration in each case in spite of the fixing of the sliding elements 3 to the longitudinal profile 21.

In the embodiment shown here of the telescopic system 1 the sliding elements 3 are arranged in pairs between the at least two profile rails 2. The sliding elements 3 of the one sliding element pair 31 are axially non-displaceably connected to the one of the at least two profile rails 2 and those of the other sliding element pair 31 are axially non-displaceably connected to the other of the at least two profile rails 2. To have a travel distance w which is as great as possible the sliding elements 3 are respectively arranged in an end region with respect to the longitudinal direction l, here even at the ends, in flush relationship with the profile rail 2 associated therewith. In addition the sliding elements 3 are arranged to be supported at that profile rail 2 in each case over their entire axial length in relation to the longitudinal direction l. Both measures can be seen by way of example in FIGS. 1B, 1C and 2B. In addition the sliding elements 3 of the sliding element pair 31 are arranged and oriented in mirror-image symmetrical relationship perpendicularly to the first transverse direction q1, in relation to a first plane of mirror-image symmetry S1. Correspondingly the parts of the longitudinal profiles of both profile rails with which the sliding elements are coupled are of a mirror-image symmetrical configuration in relation to that first plane of mirror-image symmetry.

The sliding element 3 and the clamping element 4 are also fixed to each other in positively locking relationship in relation to the longitudinal direction l and in addition the sliding plane G. As can be seen for example from FIGS. 4A through 4C the clamping element 4 here is in the form of a threaded pin of a circular-cylindrical basic shape. The sliding element 3 has a longitudinal profile 32 extending in the longitudinal direction l in the installed position, here with two rib-like longitudinal projections 33, each with a receiving recess 331. In the case of fixing the sliding element 3 to an associated profile rail 2 the sliding element 3 engages with one of its longitudinal projections 33 and more specifically with its receiving recess 331 over the clamping element 4 arranged with a clamping fit in the longitudinal groove 22. The clamping element 4 is disposed here with simultaneous latching axially at both ends in positively locking relationship and is thus non-displaceable in the receiving recess 331 on the sliding element 3.

The sliding element 3 here has two rib-like longitudinal projections 33 each with a receiving recess 331. Both rib-like longitudinal projections 33 engage into an associated longitudinal groove 22 of the longitudinal profile 21 of the profile rails 2. In this case the associated clamping element 4 is arranged with a clamping fit in the longitudinal groove 22 of the one profile rail 2, to which the sliding element 3 is fixed. In the installed position the clamping element 3 is arranged non-displaceably with respect to the longitudinal direction l in the receiving recess 331 by way of the clamping element 4. The other of the two longitudinal projections 33 engages only slidingly displaceably in the associated longitudinal groove 22 of the other profile rail 2.

The longitudinal grooves 22 in the profile rails 2, that are associated with the longitudinal projections 33 of the sliding element 3, are laterally open in the second transverse direction q2. Correspondingly in the installed position the rib-like longitudinal projection 33 extends with its free end region 331 in the second transverse direction q2. As can be seen for example from FIG. 4C the receiving recess 331 is in the form of an incision 332, here of a right-angled longitudinal profile.

The sliding element 3 is of a basic shape which is flat with respect to the second transverse direction q2. The sliding element 3 has a base 34. In the installed position it is arranged here parallel to the sliding plane G. The bases 34 of all sliding elements 3 used in the telescopic system 1 extend here parallel to the sliding plane G. The bases of the sliding elements 3 which are arranged between two profile rails 2 coupled slidingly displaceably by way of said sliding elements 3 extend in the same plane parallel to the sliding plane G. The sliding elements of two profile rails 2 which are slidingly displaceably coupled together by way of those sliding elements are arranged and oriented in mirror-image symmetrical relationship in relation to a first plane of mirror-image symmetry S1.

FIG. 7 shows an end view of a telescopic system 1 which has only two profile rails 2, a first profile rail 2a which here is arranged downwardly and a second profile rail 2b which here is arranged upwardly. The two profile rails 2 bear slidingly displaceably against each other by way of two sliding element pairs 31 each with two sliding elements 3, wherein one sliding element pair 31 is in non-displaceable contact with the here upper profile rail 2 and a sliding element pair 31 is in non-displaceable contact with the here lower profile rail 2. The sliding elements 3 shown in the end view in FIG. 7 are connected non-displaceably to the here lower profile rail 2. As can be clearly seen in both sliding elements 3 the two longitudinal projections 33 extend jointly from one side of the base 34 in the second transverse direction q2 and more specifically here inwardly with respect to the second transverse direction q2. In relation to both sliding elements 3 a respective longitudinal projection 33 referred to as the first longitudinal projection 332 extends with its free end region 333 in that common direction and engages into an associated longitudinal groove 22 of the profile rail 2 which is the upper rail in FIG. 7. As can be seen from FIG. 7 by means of the blackening surrounding the free end region 333 of that longitudinal projection 33 and representing a clamping element 4 a clamping element 4 is arranged with a clamping fit in that longitudinal groove 22 of the upper profile rail 2. Docked thereto is the longitudinal projection 33 and therewith the respectively associated sliding element 3 in itself non-displaceably with respect to the sliding plane G. The other longitudinal projection 33 referred to as the second longitudinal projection 334 extends from the base 34 with a portion 337 in the direction towards the here upper profile rail 2. In a free end region 333 adjoining the portion 337 the longitudinal projection is bent over in a hook-like configuration about an axis of curvature parallel to the longitudinal direction l, forming a receiving groove 335. The free end region 333 of the second longitudinal projection 334 extends towards the lower profile rail 2 in FIG. 7. The free end region 333 engages into an associated longitudinal groove 22 in that lower profile rail 2. As can be seen from the blackening which here is incomplete no clamping element 4 is provided at that end, shown in FIG. 7, of the telescopic system 1 in the longitudinal groove 22. Accordingly the two sliding elements 3 are slidingly displaceably connected at that location to the here lower profile rail 2. The longitudinal grooves 22 associated with those longitudinal projections 33 are respectively laterally open in the second transverse direction q2.

As can further be seen from FIG. 7 the second longitudinal projection 334 extends with its portion 337 in the second transverse direction q2 here between the longitudinal groove 22 of the upper profile rail 2 for the first longitudinal projection 332 and the longitudinal groove 22 of the lower profile rail 2 for the second longitudinal projection 334. In that region the sliding element 3 and the respective longitudinal groove 22 bear play-free or almost play-free against each other by way of sliding guide surfaces 5 here referred to as first sliding guide surfaces 51. Those sliding guide surfaces 51 are here arranged perpendicularly to the first transverse direction q1 or, with respect to FIG. 7, vertically. In that way the two profile rails 2 are held against each other in securely guided relationship with respect to the first transverse direction q1 by way of the sliding element at the first sliding guide surfaces 51.

As can be seen inter alia from FIGS. 6 and 7 a rib-like further longitudinal projection 336 extends in a prolongation of the base 34, more specifically parallel to the sliding plane G and in the embodiments of the telescopic system 1 shown in the Figures radially outwardly with respect to the longitudinal direction 1. The rib-like further longitudinal projection engages into a further longitudinal groove 221, which here is radially outward, in an associated profile rail 2, as shown in FIG. 7 the lower profile rail 2. That further longitudinal groove 221 is open radially inwardly laterally in the first transverse direction q1, more specifically here with respect to the longitudinal direction 1. Similarly to the second longitudinal projection 334 the further longitudinal projection 336 in its free end region 333 is bent over in a hook-like configuration parallel to the longitudinal direction 1. In that way it defines a further receiving groove 338. That further receiving groove 338 is identical to the further longitudinal groove 221 in the first transverse direction q1 and here more specifically is of a radially inwardly laterally open configuration with respect to the longitudinal direction 1. A receiving rib 231 provided at the upper profile rail 2 in FIG. 7 engages into the further receiving groove 338 in the installed condition. The further longitudinal projection 336 is defined radially inwardly in relation to its axial extent in the first transverse direction q1 at least over the axial extent of its further receiving groove 338 with respect to the longitudinal direction 1. Accordingly the two longitudinal profiles 2 bear play-free or almost play-free in the region of the further receiving groove 338 against the wall of the further longitudinal groove 221 of the lower profile rail 2 and the wall of the receiving rib 231 of the upper profile rail 2, more specifically by way of the further longitudinal projection 336 of the sliding element 3. The surfaces at which that play-free or almost play-free contact occurs are here in the form of sliding guide surfaces 5 referred to as second sliding guide surfaces 52. The second sliding guide surfaces 51 extend in or in opposite relationship to the second transverse direction q2. They are arranged horizontally in the Figures. Accordingly the two profile rails 2 are arranged held against each other in securely guided relationship with respect to the second transverse direction q2 by way of the sliding element 3.

Figures 1A, 1B, 1C, 1D, 2A, 2B, 2C, 2D:
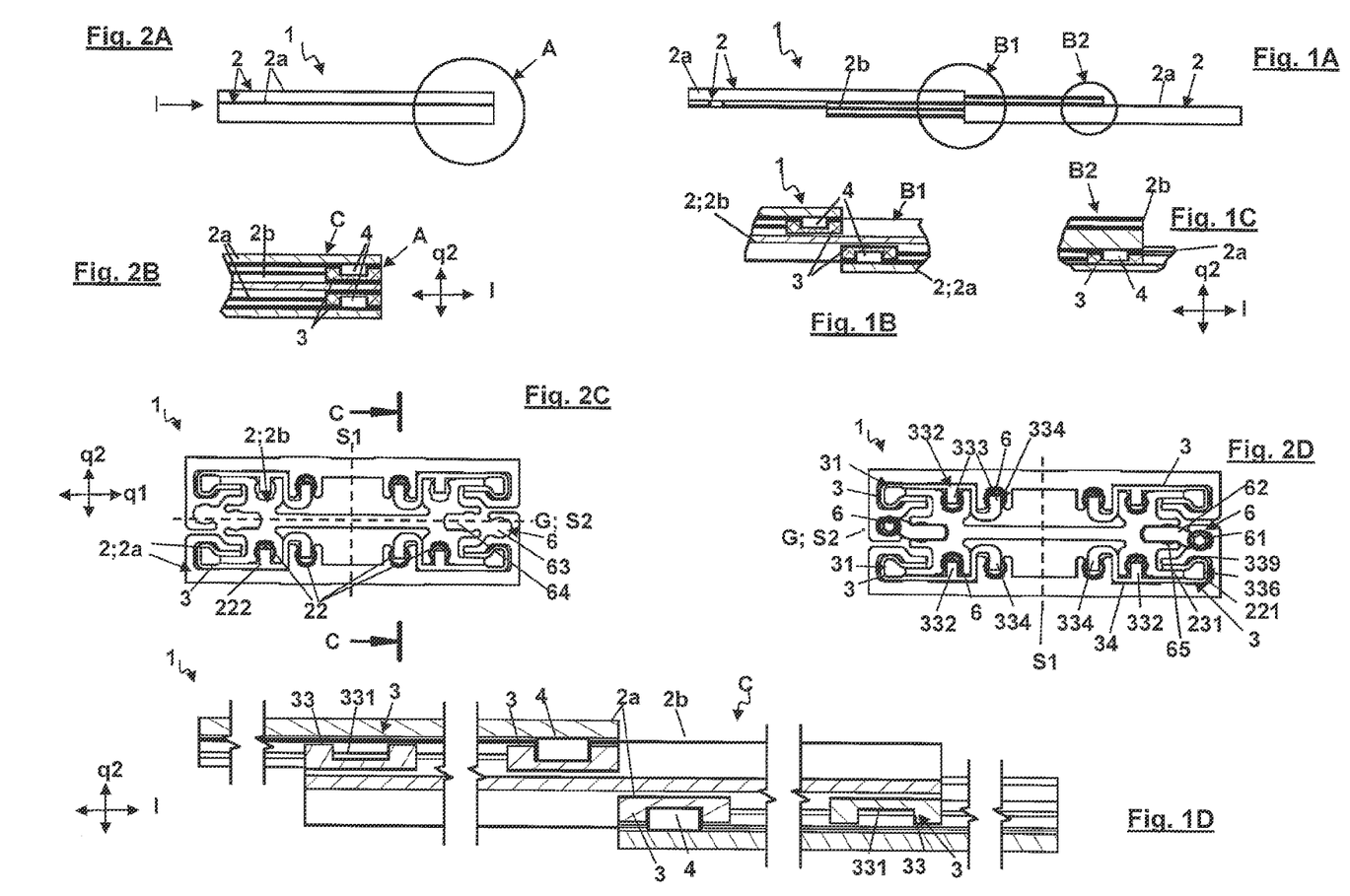
Figure 3A:
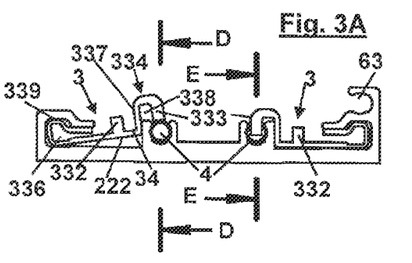
FIGS. 3A-3C, 4A-4B and 5A-5B show views with side views and sectional views relating to the assembly of two profile rails with sliding elements in three steps.
Figure 3B:
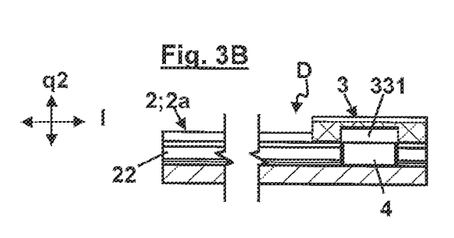
Figure 3C:
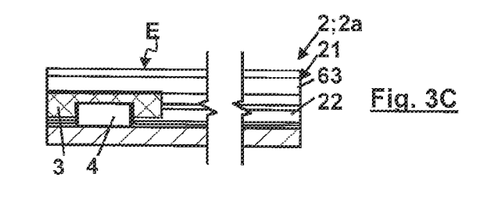

In assembly one of the two longitudinal projections 33, associated with that longitudinal groove 22, is displaced with its receiving recess 331 axially over the clamping element 4 and is lowered into the receiving recess 331 towards the clamping element 4 with positively locking mounting of the clamping element 4. FIGS. 3A-5C show side views and sectional views of various assembly steps for assembling two profile rails 2 to form the telescopic system 1. FIGS. 3A-3C and FIGS. 4A-4B show the assembly of the sliding element pair 31 respectively associated with a profile rail 2. In this case as already previously the required clamping elements 4 are moved into a clamping fit at the appropriate locations in the respective longitudinal groove 22. In FIG. 3A the sliding element 3 which here is at the right is already non-displaceably connected to the lower profile rail 2, by the sliding element 3 being connected in positively locking relationship to the associated clamping element 4. In FIG. 3B the sliding element 3 at the left is firstly brought into engagement with the further longitudinal groove 221 with its further longitudinal projection 336. Parallel thereto the sliding element 3 is pivoted upwardly here at the further longitudinal groove 221 so that it can be slidingly displaced in the further longitudinal groove 221 with its second longitudinal projection 334 having the receiving recess 331, by way of the associated clamping element 4, and is positioned with its receiving recess 331 relative to the second transverse direction q2 in aligned relationship with the clamping element 4. That is shown in FIG. 3B. Then the sliding element 3 is pivoted down over the clamping element 4 whereby the clamping element 4 is connected to the sliding element in positively locking relationship. That is shown in FIG. 3C.

Figure 4A:
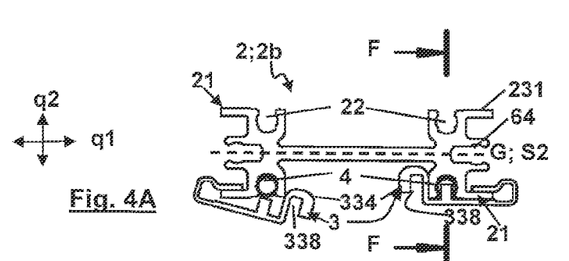
Figure 4B:
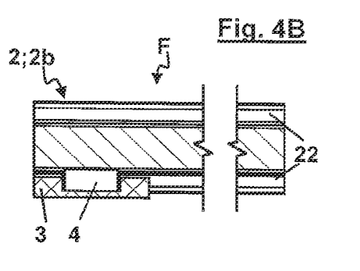

The procedure is similar when mounting the sliding element 3 to the other profile rail 2 shown in FIGS. 4A-4B. Here the sliding element 3 which is at the right is already non-displaceably connected to the other profile rail 2 while the sliding element 3 at the left is still involved in being fitted. For that purpose the sliding element 3 at the left is pushed with the receiving groove 335 of the its further longitudinal projection 336 on to the receiving rib 231 of the other profile 2 in the longitudinal direction and at the same time pivoted on the receiving rib 23 in the second transverse direction q2 until here too the receiving recess 231 is positioned in alignment with the associated clamping element 4 with respect to the second transverse direction q2. Then the sliding element 3 is again pivoted down over the clamping element 4 with positively locking fitment thereof.

Figure 5A:
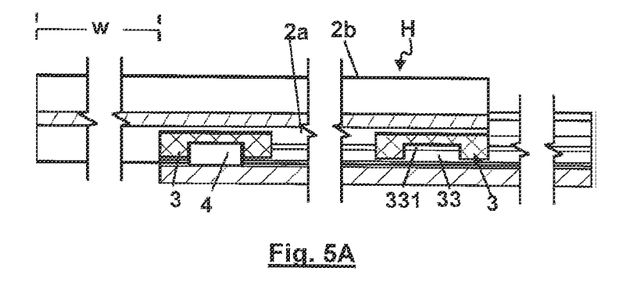
Figure 5B:
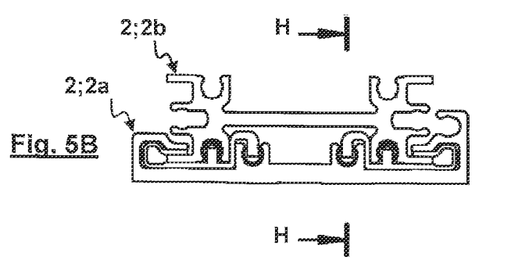

An effective tongue-and-groove connection is achieved inter alia in the first transverse direction q1 with the engagement of the two longitudinal projections, that is to say the first longitudinal projection and the second longitudinal projection, of the sliding element 3 respectively in the second transverse direction q2 into the respectively associated longitudinal groove 22 of the respective profile rail. A tongue-and-groove connection which is operative inter alia with respect to the second transverse direction q2 is achieved with the engagement of the further longitudinal projection 336 of the sliding element 3 into the associated further longitudinal groove 221 and of the rib 231 into the further receiving groove 338 of the further longitudinal projection 336. That means that the two profile rails have to be pushed into each other at the ends in the longitudinal direction 1 in the assembly procedure. In FIGS. 5A-5C the two profile rails 2 equipped with the sliding elements 3 are pushed at the ends into each other. To facilitate that assembly procedure, a number of measures are afforded, as described hereinbefore. One of these is that the sliding guide surfaces 5 of the sliding elements 3 each have a bevel operative in the longitudinal direction 1, in the form of inclined insertion portions 35. In addition the inclined insertion portions 35 of the first sliding guide surfaces 51 are arranged spaced in relation to the inclined insertion portions 35 of the second sliding guide surfaces 52 by the amount a shown in FIG. 6C in the longitudinal direction 1. In that way the operation of "threading in" the profile rails 2 at the respective sliding guide surfaces 51, 52 is displaced in location with respect to an axial insertion path of movement relative to the longitudinal direction 1, over the axial extent of the sliding elements 3. In addition the first sliding guide surfaces 51 are arranged radially inwardly with respect to the longitudinal direction 1 and the second sliding guide surfaces 52 are arranged radially outwardly, which also permits displaced threading-in engagement at the first sliding guide surfaces 51 relative to the second sliding guide surfaces 52.

The further longitudinal groove 221 has an undercut configuration 339 operative in the first transverse direction q1. At that undercut configuration, the further longitudinal projection 332 adapted to the further longitudinal groove is arranged held in positively locking relationship to prevent a possible relative movement in the first transverse direction q1. By virtue of those measures, the two profile rails 2 as well as the sliding element which embraces the receiving rib 231 can be at least stabilized in position in relation to a relative movement in the first transverse direction.

An additional longitudinal groove 222 which is open laterally in the second transverse direction q2 is provided to afford anti-tipping security, in the longitudinal profile of the lower profile rail 2 in FIG. 7 for the sliding element 3. The sliding element 3 is arranged in positively locking relationship in the additional longitudinal groove 222. For that purpose it bears with its base 34 in surface contact against the bottom of the longitudinal groove 222 and in the first transverse direction q1 at both sides. The support effect is afforded at the one side by way of its further longitudinal projection 336 in the further longitudinal groove 221. At the other side the support is provided externally at the longitudinal groove 22 associated with the second longitudinal projection 334, more specifically by way of the portion 337 of that longitudinal projection 336.

To delimit the travel distance w of two profile rails 2 which are guided against each other and which are moveable relative to each other there is an abutment device 6 which is shown primarily in FIGS. 9A-10C. The abutment device 6 has two end abutments 61 axially spaced with respect to the longitudinal direction 1 and an abutment element 62 cooperating with the end abutments 61. Here clamping elements which are like the above-described clamping elements 4 serve as the end abutments 61. In addition the clamping elements 4 which are not shown here have dampers operative in the longitudinal direction 1. The clamping elements 4 are respectively fixed in the end region of one of the two profile rails 2 in the abutment groove 63. The abutment element 62 is here fixed centrally with respect to the longitudinal direction 1 in a further abutment groove 64 by means of a further clamping element 4. The abutment element 62 projects for abutting against the two end abutments 61 out of the further abutment groove 64 between the two end abutments 61 into the abutment groove 63. As can be seen for example from FIG. 2C the further abutment groove 63 has two guide grooves 65 which are provided in the second transverse direction q2 and which are in mirror-image symmetrical relationship with the sliding plane G and into which the abutment element 62 latchingly engages upon assembly. For assembly purposes the clamping element 4 is clamped fast at a given location in the further abutment groove 63. Then the abutment element 62 is put over the clamping element 4 in the first transverse direction q1 with latching engagement in the guide grooves 65 with its receiving recess 331.

Referring to FIGS. 1A-5C and 8A-9C the telescopic system 1 has three profile rails 2, that is to say two first profile rails 2a which here are arranged outwardly and a second profile rail 2b which is arranged between the two first profile rails 2a. It is generally sufficient to provide two profile rails 2 only on one side of the longitudinal profile 21. Because of the abutment grooves 63, 64, with an arrangement of the abutment device 6 at one side, there is an asymmetry in regard to the cross-section of the lower first profile rail 2a. Referring to FIG. 2D the abutment device 6 for limiting the travel movement between the upper outer profile rail 2 and the central profile rail 2 is arranged at the left-hand side of the telescopic system 1 and the abutment device 6 for limiting the travel movement between the lower outer profile rail 2 and the central profile rail 2 is arranged at the right-hand side of the telescopic system 1. Nonetheless the two outer first profile rails 2a can be of identical structure insofar as they are arranged with their longitudinal profiles 21 facing towards each other and rotated relative to each other through 180° about the second transverse axis. At its sides towards the two outer first profile rails 2a the central second profile rail 2b has a respective identical longitudinal profile 21 which is the same as the longitudinal profile 21 of the upper second profile rail 2b described with reference to FIG. 7.

The telescopic system 1 shown in an end view in FIG. 8 has five telescopic rails 2: two outwardly arranged first profile rails 2a, a centrally arranged first profile rail 2a, provided at both sides with identical longitudinal profiles 21, and two second profile rails 2b respectively between one of the outwardly arranged first profile rails 2a and the centrally arranged first profile rail 2a, provided at both ends with identical longitudinal profile 21. It will be clear therefrom that the number of profile rails 2 can be enlarged by the profile rails 2 which are mounted slidingly displaceably against each other by way of the sliding elements being combined in such a way that at one of the mutually facing sides they have a longitudinal profile 21 of the first profile rail 2a and at the other of the mutually facing sides a longitudinal profile 21 of the second profile rail 2b.

LIST OF REFERENCES 1 telescopic system
2 profile rail
21 longitudinal profile
22 longitudinal groove
221 further longitudinal groove
222 additional longitudinal groove
23 longitudinal rib
231 receiving rib
2a first profile rail
2b second profile rail
3 sliding element
31 sliding element pair
32 longitudinal profile
33 longitudinal projection
331 receiving recess
332 first longitudinal projection
333 free end region
334 second longitudinal projection
335 receiving groove
336 further longitudinal projection
337 portion
338 further receiving groove
339 undercut configuration
34 base
35 inclined insertion portion
4 clamping element
5 sliding guide surface
51 first sliding guide surface
52 second sliding guide surface
6 abutment device
61 end abutment 62 abutment element
63 abutment groove
64 further abutment groove
65 guide groove
G sliding plane
S1 first plane of mirror-image symmetry
S2 second plane of mirror-image symmetry
a spacing
l longitudinal direction
q1 first transverse direction
q2 second transverse direction
w travel distance

What is claimed is:

1. A telescopic system comprising:
at least two profile rails having been extruded or injection molded and having an identical cross-section along their whole length, which are linearly guided against each other in a longitudinal direction and which are moveable relative to each other over a distance and which each have a longitudinal profile having longitudinal grooves and/or longitudinal ribs,
wherein provided at each profile rail is at least one sliding element, by which the at least two profile rails bear slidingly displaceable against each other and which is arranged axially fixedly at least with respect to the longitudinal direction of the longitudinal profile of the profile rails associated therewith,
wherein the sliding element is connected to a clamping element in non-displaceable relationship on the profile rail at least with respect to a sliding plane defined by the longitudinal direction and a first transverse direction perpendicularly to the longitudinal direction,
wherein the clamping element is arranged with a clamping fit on the longitudinal profile of the profile rail, more specifically in or at a longitudinal groove of the longitudinal grooves and/or on a longitudinal rib of the longitudinal ribs, and
wherein for fixing the clamping element on the longitudinal profile and for fixing the sliding element to the respective profile rail no further processing and structural modification of the respective profile rail after having been extruded or injection molded is performed.

2. The telescopic system as set forth in claim 1, wherein the sliding element and the clamping element are arranged fixed to each other in positively locking relationship and/or force-locking relationship at least with respect to the longitudinal direction or the sliding plane.

3. The telescopic system as set forth in claim 1, wherein the sliding element engages axially over the clamping element with respect to the longitudinal direction and bears axially at both ends of the clamping element against same in positively locking relationship.

4. The telescopic system as set forth in claim 1, wherein the clamping element is of a cylindrical, part-cylindrical, semi-cylindrical, prismatic or ball-like shape.

5. The telescopic system as set forth in claim 1, wherein the clamping element is in a form of a bolt, threaded bolt, pin, threaded pin or ball.

6. The telescopic system as set forth in claim 1, wherein the sliding element has at least one rib-like longitudinal projection having a receiving recess and the at least one rib-like longitudinal projection engages over the clamping element with the clamping element being received in the receiving recess.

7. The telescopic system as set forth in claim 6, wherein the receiving recess is in a form of an incision, gap or interruption in the rib-like longitudinal projection.

8. The telescopic system as set forth in claim 6, wherein the sliding element has two rib-like longitudinal projections, wherein the sliding element in an installed position is fixed with one of the at least two rib-like longitudinal projections by the clamping element on the longitudinal profile of the profile rail associated with the sliding element and is coupled with the other of the at least two rib-like longitudinal projections to the longitudinal profile of the other profile rail slidingly displaceably in the longitudinal direction.

9. The telescopic system as set forth in claim 8, wherein the sliding element has a flat basic shape with a base parallel or approximately parallel to the sliding plane, wherein the at least two rib-like longitudinal projections extend in a common direction perpendicularly or approximately perpendicularly to the sliding plane away from one side of the base and/or a rib-like further longitudinal projection extends in or approximately in the first transverse direction away from the base.

10. The telescopic system as set forth in claim 9, wherein the two rib-like longitudinal projections comprise a rib-like first longitudinal projection and a rib-like second longitudinal projection, wherein the rib-like first longitudinal projection extends with its free end region in the common direction and the rib-like second longitudinal projection is of a configuration at its free end region curved hook-like about a curvature axis parallel to the longitudinal direction to provide a receiving groove for a longitudinal rib of the profile rail associated therewith.

11. The telescopic system as set forth in claim 10, wherein the receiving groove is laterally opened in an opposite direction to the common direction.

12. The telescopic system as set forth in claim 9, wherein the rib-like further longitudinal projection of the sliding element has a free end region which is curved in a hook-like configuration parallel to the longitudinal direction, wherein the free end region delimits a further receiving groove open laterally in the first transverse direction for a receiving rib of the profile rail associated therewith.

13. The telescopic system as set forth in claim 12, wherein the further receiving groove is arranged open laterally radially inwardly with respect to the longitudinal direction.

14. The telescopic system as set forth in claim 9, wherein the rib-like further longitudinal projection engages in the first or approximately the first transverse direction into a further longitudinal groove of an associated profile rail associated therewith.

15. The telescopic system as set forth in claim 14, wherein the further longitudinal groove has an undercut configuration operative in or approximately in the first transverse direction and the rib-like further longitudinal projection in an installed position is arranged in positively locking relationship in the further longitudinal groove.

16. The telescopic system as set forth in claim 9, wherein the rib-like further longitudinal projection is operative resiliently with respect to a second transverse direction.

17. The telescopic system as set forth in claim 9, wherein the sliding element for guiding the profile rail mounted slidingly displaceably thereon has side surfaces which are in a form of sliding guide surfaces and of which some of the sliding guide surfaces in a form of first sliding guide surfaces are arranged perpendicularly to the first transverse direction or some of the sliding guide surfaces in a form of second sliding guide surfaces are arranged perpendicularly to a second transverse direction perpendicularly to the first transverse direction.

18. The telescopic system as set forth in claim 17, wherein at least one of the at least two rib-like longitudinal projections of the sliding element has the first sliding guide surfaces and/or the rib-like further longitudinal projection of the sliding element has the second sliding guide surfaces.

19. The telescopic system as set forth in claim 17, wherein the first sliding guide surfaces are arranged spaced with respect to the first transverse direction in relation to the second sliding guide surfaces.

20. The telescopic system as set forth in claim 17, wherein the sliding guide surfaces have inclined insertion portions at both ends for easier mounting with respect to the longitudinal direction.

21. The telescopic system as set forth in claim 9, wherein the bases of the sliding elements are arranged between the two profile rails in a common plane parallel to the sliding plane.

22. The telescopic system as set forth in claim 9, wherein the sliding elements are arranged and/or orientated between the two profile rails in mirror-image symmetrical relationship with each other relative to a central first mirror-image plane of symmetry perpendicularly to the first transverse direction.

23. The telescopic system as set forth in claim 1, wherein the sliding elements are of an identical structure and/or are each of an integral structure.

24. The telescopic system as set forth in claim 23, wherein the central profile rail at its sides facing towards the two outer profile rails respectively has an identical longitudinal profile adapted to the longitudinal profile of the outer profile rail associated therewith.

25. The telescopic system as set forth in claim 1, wherein there are provided at least three profile rails mounted to each other linearly displaceably relative to each other, wherein the at least three profile rails comprise two outer profile rails and a central profile rail mounted displaceably between the two outer profile rails.

26. The telescopic system as set forth in claim 25, wherein the two outer profile rails are of an identical structure.

27. The telescopic system as set forth claim 1, wherein for limiting the travel distance of the at least two profile rails which are gudied against each other and are moveable relative to each other there is provided an abutment device having two end abutments and an abutment element cooperating with the end abutment, wherein the two end abutments are fixed in mutually spaced relationship in an abutment groove provided in the longitudinal profile of one of the at least two profile rails at a respective given location over a longitudinal extent of the abutment groove and the abutment element is arranged slidingly displaceably or fixed in position in a further abutment groove provided in the longitudinal profile of the other profile rail, wherein the abutment element is arranged to abut against the two end abutments projecting out of the further abutment groove between the two end abutments into the abutment groove.

28. The telescopic system as set forth in claim 27, wherein the end abutments are respectively formed by a clamping element and/or the abutment element is arranged fixed in position by a clamping element in the further abutment groove associated therewith.

\* \* \* \* \*